(12) United States Patent
Ma et al.

(10) Patent No.: US 11,216,278 B2
(45) Date of Patent: Jan. 4, 2022

(54) MULTI-THREAD PROCESSING

(71) Applicant: Advanced New Technologies Co., Ltd., George Town (KY)

(72) Inventors: Ling Ma, Hangzhou (CN); Wei Zhou, Hangzhou (CN); Changhua He, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/806,937

(22) Filed: Mar. 2, 2020

(65) Prior Publication Data

US 2021/0049014 A1 Feb. 18, 2021

Related U.S. Application Data

(63) Continuation of application No. PCT/CN2020/071423, filed on Jan. 10, 2020.

(30) Foreign Application Priority Data

Aug. 12, 2019 (CN) .......................... 201910739180.8

(51) Int. Cl.
*G06F 9/44* (2018.01)
*G06F 9/30* (2018.01)
(Continued)

(52) U.S. Cl.
CPC .......... *G06F 9/30181* (2013.01); *G06F 8/441* (2013.01); *G06F 9/3013* (2013.01); *G06F 9/3851* (2013.01)

(58) Field of Classification Search
CPC .... G06F 8/441; G06F 9/3013; G06F 9/30181; G06F 9/3851
(Continued)

(56) References Cited

U.S. PATENT DOCUMENTS 6,920,546 B2 * 7/2005 Gochman ............... G06F 9/383
712/208
8,418,179 B2 * 4/2013 Papakipos ............. G06F 9/5066
718/100
(Continued)

FOREIGN PATENT DOCUMENTS

CN 1853165 10/2006
CN 102681890 9/2012
(Continued)

OTHER PUBLICATIONS

Rakvic et al., "Energy Efficiency via Thread Fusion and Value Reuse", 2010, Institution of Engineering and Technology: Advances, Systems and Applications, pp. 114-125. (Year: 2010).*
(Continued)

*Primary Examiner* — Ted T. Vo
(74) *Attorney, Agent, or Firm* — Fish & Richardson P.C.

(57) ABSTRACT

A computer-implemented method for multi-thread processing, the method including: compiling a first plurality of threads using a corresponding first register set for each thread in the first plurality of threads, to obtain a first plurality of corresponding machine instruction codes; and fusing the first plurality of machine instruction codes using first instructions in an instruction set supported by a processing core, to obtain machine instruction code of a fused thread, the machine instruction code of the fused thread including thread portions corresponding to each thread of the first plurality of threads, in which the first instructions include load effective address instructions and control transfer instructions, in which the load effective address instructions and the control transfer instructions are compiled using a second register set, and in which jump operations between thread portions are implemented by the control transfer
(Continued)

instructions inserted into the machine instruction code of the fused thread.

21 Claims, 10 Drawing Sheets

(51) Int. Cl.
*G06F 9/38* (2018.01)
*G06F 8/41* (2018.01)

(58) Field of Classification Search
USPC .................................................. 717/149–161
See application file for complete search history.

(56) References Cited

U.S. PATENT DOCUMENTS

| | | | | |
|---|---|---|---|---|
| 9,244,686 | B2* | 1/2016 | Henry | G06F 9/4403 |
| 9,690,591 | B2* | 6/2017 | Ouziel | G06F 9/3016 |
| 10,324,724 | B2* | 6/2019 | Lai | G06F 9/30196 |
| 2004/0128480 | A1* | 7/2004 | Anati | G06F 9/3802 |
| | | | | 712/214 |
| 2016/0179542 | A1* | 6/2016 | Lai | G06F 9/3017 |
| | | | | 712/208 |
| 2018/0004526 | A1 | 1/2018 | Lyra | |
| 2018/0196671 | A1 | 7/2018 | Hughes et al. | |

FOREIGN PATENT DOCUMENTS

| | | |
|---|---|---|
| CN | 105242962 | 1/2016 |
| CN | 105408860 | 3/2016 |
| CN | 107368285 | 11/2017 |
| CN | 109614220 | 4/2019 |
| CN | 110569067 | 12/2019 |

OTHER PUBLICATIONS

Gonzalez et al., "Thread Fusion", 2008, ACM, pp. 363-368. (Year: 2008).*
Ipek et al., "Core Fusion: Accommodating Software Diversity in Chip Multiprocessors", ACM, 2007, pp. 186-197. (Year: 2007).*
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
PCT International Search Report and Written Opinion in International Application No. PCT/CN2020/071423, dated May 19, 2020, 17 pages (with machine translation).
Li et al., "Design of the Simultaneous Multithreading Godson-2 Processor," Chinese Journal of Computers, Nov. 2009, 32(11)12265-2273 (with English abstract).

* cited by examiner

```
Thread1
    L_start_1
    1.1 mov r1, r3
    L_loop_1
    1.2 add (addr1), r1
    1.3 mul r1, r2
    1.4 mov r2, addr1
    1.5 sub $1, r3
    1.6 ja L_loop_1
    L_sub_again
    1.7 sub r1, r3
    1.8 cmp 0, r3
    1.9 ja L_sub_again
    L_loop_2
    1.10 sub (addr1), r1
    1.11 div r1, r2
    1.12 add r2, addr1
    1.13 add $3, r3
    1.14 jbe L_loop_2
    . . .
Thread2
    L_start_2
    2.1 mov $9, r1
    2.2 mov $100, r3
    L_loop_3
    2.3 add (addr1), r1
    2.4 mul r1, r3
    2.5 add r3, addr1
    2.6 sub $1, r3
    2.7 ja L_loop_3
    2.8 add $9, r3
    . . .
Thread3
    L_start_3
    3.1 mov r2, r4
    L_loop_4
    3.2 sub (addr1), r1
    3.3 div r2, r1
    3.4 sub r1, addr1
    3.5 sub $1, r4
    3.6 ja L_loop_4
    . . .
```

FIG. 2

Thread Fusion 1.1 lea r6, L_Thread2(rip)
    1.2 lea r10, L_Thread3(rip)
    L_Thread_1
    1.3 mov r1, r3
    1.4 lea r5, Leave_loop_1(rip)
    1.5 lea r4, L_loop_1(rip)
    L_loop_1
    1.6 add (addr1), r1
    1.7 mul r1, r2
    1.8 mov r2, addr1
    1.9 sub $1, r3
    1.10 cmovbe r5, r4
    1.11 jmp r6
    Leave_loop_1:
    L_sub_again
    1.12 sub r1, r3
    1.13 cmp $0, r3
    1.14 ja L_sub_again
    1.15 lea r5, Leave_loop_2(rip)
    1.16 lea r4, L_loop_2(rip)
    L_loop_2
    1.17 sub (addr1), r1
    1.18 div r1, r2
    1.19 add r2, addr1
    1.20 add $3, r3
    1.21 cmovbe r5, r4
    1.22 jmp r6
    Leave_loop_2:
    . . .
    L_Thread_2
    2.1 lea r7, Leave_loop_3(rip)
    2.2 lea r6, L_loop_3(rip)
    2.3 mov $9, r8
    2.4 mov $100, r9
    L_loop_3
    2.5 add (addr2), r8
    2.6 mul r8, r9
    2.7 add r9, addr2
    2.8 sub $1, r9
    2.9 cmovbe r7, r6
    2.10 jmp r10
    Leave_loop_3:
    2.11 add $9, r9
    . . .

L_Thread_3
    3.1 lea r11, Leave_loop_4(rip)
    3.2 lea r10, L_loop_4(rip)
    3.3 mov r12, r13
    L_loop_4
    3.4 sub (addr3), r14
    3.5 div r12, r14
    3.6 sub r14, addr3
    3.7 sub $1, r13
    3.8 cmovbe r11, r10
    3.9 jmp r4
    Leave_loop_4:
    . . .

FIG. 6

Thread Fusion
    1.1 lea r6, L_Thread2(rip)
    1.2 lea r10, L_Thread3(rip)
    L_Thread_1
    1.3 mov r1, r3
    L_loop_1
    1.4 add (addr1), r1
    1.5 mul r1, r2
    1.6 mov r2, addr1
    1.7 sub $1, r3
    1.8 leaaj L_loop_1(r4), r6
    L_sub_again
    1.9 sub r1, r3
    1.10 cmp $0, r3
    1.11 ja L_sub_again
    L_loop_2
    1.12 sub (addr1), r1
    1.13 div r1, r2
    1.14 add r2, addr1
    1.15 add $3, r3
    1.16 leaaj L_loop_2(r4), r6
    • • •
    L_Thread_2
    2.1 mov $9, r8
    2.2 mov $100, r9
    L_loop_3
    2.3 add (addr2), r8
    2.4 mul r8, r9
    2.5 add r9, addr2
    2.6 sub $1, r9
    2.7 leaaj L_loop_3(r6), r10
    2.8 add $9, r9
    • • •
    L_Thread_3
    3.1 mov r11, r12
    L_loop_4
    3.2 sub (addr3), r13
    3.3 div r11, r13
    3.4 sub r13, addr3
    3.5 sub $1, r12
    3.6 leaaj L_loop_4(r10), r4
    • • •

FIG. 7

MULTI-THREAD PROCESSING

CROSS-REFERENCE TO RELATED APPLICATIONS

This application is a continuation of PCT Application No. PCT/CN2020/071423, filed on Jan. 10, 2020, which claims priority to Chinese Patent Application No. 201910739180.8, filed on Aug. 12, 2019, and each application is hereby incorporated by reference in its entirety.

TECHNICAL FIELD

Implementations of the present specification generally relate to computer application technologies, and more specifically, to multi-thread processing methods, apparatuses, and systems.

BACKGROUND

In the multi-thread processing mechanism, the CPU prepares an independent hardware running environment for each thread to run the thread. For example, the CPU prepares hardware resources such as instruction predictions, instruction executions, and instruction submissions for each thread. Generally, when a quantity of running threads increases from one to two, hardware costs are increased by 5%. A larger quantity of threads running in the multi-thread processing mechanism leads to larger hardware costs that need to be increased.

SUMMARY

In view of the problems, implementations of the present specification provide multi-thread processing methods, apparatuses, and systems. Based on the methods, the apparatuses, and the systems, a plurality of threads can be fused into a single fused thread for running, so that multi-thread processing is implemented without increasing hardware costs.

According to an aspect of the implementations of the present specification, multi-thread processing methods are provided, including: compiling threads in a first quantity of to-be-processed threads by using different first register sets, to obtain corresponding machine instruction codes; and fusing the machine instruction codes of the threads by using first instructions in an instruction set supported by a processing core, to obtain a machine instruction code of a single fused thread. The first instructions include load effective address (LEA) instructions and control transfer instructions, the load effective address instructions and the control transfer instructions are compiled by using second registers different from the first register set, and the control transfer instructions are set in the machine instruction codes corresponding to the threads, to implement jump operations between the machine instruction codes of the threads.

Optionally, in an example of the foregoing aspect, the first quantity does not exceed a first predetermined threshold, and the first predetermined threshold is determined based on a quantity of registers available to the processing core.

Optionally, in an example of the foregoing aspect, the control transfer instructions include first control transfer instructions obtained by modifying some or all jump instructions in the machine instruction codes of the threads.

Optionally, in an example of the foregoing aspect, the control transfer instructions further include second control transfer instructions added based on control transfer instruction adding rules.

Optionally, in an example of the foregoing aspect, the control transfer instruction adding rules include at least one of the following: making an interval between the control transfer instructions no more than a second predetermined quantity of instructions; and adding the second control transfer instructions after a suitable machine instruction by using an instruction compiler tuning policy.

Optionally, in an example of the foregoing aspect, the second predetermined quantity is determined based on a quantity of instructions that the processing core can execute in a single instruction cycle.

Optionally, in an example of the foregoing aspect, each fused thread has at least one jump instruction block obtained through segmentation based on the control transfer instructions.

Optionally, in an example of the foregoing aspect, for each thread other than first threads in the first quantity of threads, the load effective address instructions include a single first load effective address instruction, and all first load effective address instructions are placed at the beginning of the machine instruction code of the fused thread, and are configured to move an address of the first instructions of the thread to a corresponding second register; and for each jump instruction block in each thread in the first quantity of threads, the load effective address instructions include two second load effective address instructions, where one second load effective address instruction is used to move an address of the first instructions of the jump instruction block to a corresponding second register, the other second load effective address instruction is used to move an address of the first instructions after the jump instruction block to a corresponding second register, the two second load effective address instructions are placed between a jump instruction block corresponding to a respective thread and a previous jump instruction block, and the control transfer instructions include conditional move instructions and unconditional jump instructions.

Optionally, in an example of the foregoing aspect, the instruction set includes leaxxj instructions, and for each thread other than first threads in the first quantity of threads, the load effective address instructions include a single first load effective address instruction, where the first load effective address is used to move an address of the first instructions of the thread to a corresponding second register, all first load effective address instructions are placed at the beginning of the machine instruction code of the fused thread, and for each jump instruction block in each thread in the first quantity of threads, the control transfer instructions include a single leaxxj instruction; where an instruction format of the leaxxj instruction is leaxxj L_loop_i(rm), rn, where a register rm represents a second register used by a first load effective address instruction of a thread including a corresponding jump instruction block, and a register rn represents a second register used by a first load effective address instruction of a to-be-jumped-to thread, where the leaxxj instruction is used to instruct to store, when a condition is satisfied, an instruction address corresponding to L_loop_i into the register rm, and store, when a condition is not satisfied, instruction addresses of the first instructions after the leaxxj instruction into the register rm, and jump to an instruction corresponding to an address stored in the register rn.

Optionally, in an example of the foregoing aspect, the second register has a flag bit used to indicate a status of the second register, and the status includes a first state indicating normal status and a second state indicating that the register points to another register; and when a machine instruction is running, if the processing core identifies that a specified value is assigned to L_loop_i in the leaxxj instruction, a physical register corresponding to the processing core is released, causing the second register rn to point to a second register used by a target thread to jump to, and a value is assigned to a flag bit of the second register rn to indicate the second state.

Optionally, in an example of the foregoing aspect, when a machine instruction is running, if the processing core has fetched the leaxxj instruction, an instruction block corresponding to an address stored in the register rn in the leaxxj instruction is pre-fetched into an instruction decoding queue of the processing core.

Optionally, in an example of the foregoing aspect, the method further includes: obtaining, by using the processing core, a machine instruction in the fused thread in units of instruction blocks for running.

Optionally, in an example of the foregoing aspect, a size of the instruction block is determined by a capability of the processing core to read instructions in a single instruction cycle.

Optionally, in an example of the foregoing aspect, when an obtained instruction block includes at least one control transfer instruction and an end instruction of the instruction block is not a control transfer instruction, the instruction block is adjusted to use the control transfer instruction as an end instruction.

According to another aspect of the implementations of the present specification, a multi-thread processing apparatus is provided, including: a thread compilation unit, configured to compile threads in a first quantity of to-be-processed threads by using different first register sets, to obtain corresponding machine instruction codes; and a thread fusion unit, configured to fuse the machine instruction codes of the threads by using first instructions in an instruction set supported by a processing core, to obtain a machine instruction code of a single fused thread. The first instructions include load effective address instructions and control transfer instructions, the load effective address instructions and the control transfer instructions are compiled by using a second register different from the first register set, and the control transfer instructions are set in the machine instruction codes corresponding to the threads, to implement jump operations between the machine instruction codes of the threads.

Optionally, in an example of the foregoing aspect, the apparatus further includes: control transfer instructions obtaining unit, configured to obtain a first control transfer instruction by modifying some or all jump instructions in the machine instruction codes of the threads.

Optionally, in an example of the foregoing aspect, the control transfer instructions obtaining unit further add second control transfer instructions based on control transfer instruction adding rules.

Optionally, in an example of the foregoing aspect, the control transfer instruction adding rules include at least one of the following: making an interval between the control transfer instructions no more than a second predetermined quantity of instructions; and adding the second control transfer instructions after a suitable machine instruction by using an instruction compiler tuning policy.

Optionally, in an example of the foregoing aspect, each fused thread has at least one jump instruction block obtained through segmentation based on the control transfer instructions.

Optionally, in an example of the foregoing aspect, for each thread other than first threads in the first quantity of threads, the load effective address instructions include a single first load effective address instruction, and all first load effective address instructions are placed at the beginning of the machine instruction code of the fused thread, and are configured to move an address of the first instructions of the thread to a corresponding second register; and for each jump instruction block in each thread in the first quantity of threads, the load effective address instructions include two second load effective address instructions, where one second load effective address instruction is used to move an address of the first instructions of the jump instruction block to a corresponding second register, the other second load effective address instruction is used to move an address of the first instructions after the jump instruction block to a corresponding second register, the two second load effective address instructions are placed between a jump instruction block corresponding to a respective thread and a previous jump instruction block, and the control transfer instructions include conditional move instructions and unconditional jump instructions.

Optionally, in an example of the foregoing aspect, the instruction set includes leaxxj instructions, and for each thread other than first threads in the first quantity of threads, the load effective address instructions include a single first load effective address instruction, where the first load effective address instruction is used to move an address of the first instructions of the thread to a corresponding second register, all first load effective address instructions are placed at the beginning of the machine instruction code of the fused thread, and for each jump instruction block in each thread in the first quantity of threads, the control transfer instructions include a single leaxxj instruction; where an instruction format of the leaxxj instruction is leaxxj L_loop_i(rm), rn, where a register rm represents a second register used by a first load effective address instruction of a thread including a corresponding jump instruction block, and a register rn represents a second register used by a first load effective address instruction of a to-be-jumped-to thread, where the leaxxj instruction is used to instruct to store, when a condition is satisfied, an instruction address corresponding to L_loop_i into the register rm, and put, when a condition is not satisfied, instruction addresses of the first instructions after the leaxxj instruction into the register rn, and jump to an instruction corresponding to an address stored in the register rn.

According to another aspect of the implementations of the present specification, a multi-thread processing system is provided, including: a compiler, including the multi-thread processing apparatus described above, and configured to compile a first quantity of threads into a machine instruction code of a single fused thread; an instruction set; and a processing core, configured to obtain a machine instruction in the fused thread in units of instruction blocks for running.

Optionally, in an example of the foregoing aspect, the instruction set includes leaxxj instructions, and an instruction format of the leaxxj instruction is leaxxj L_loop_i(rm), rn, where a register rm represents a second register used by a first load effective address instruction of a thread including a corresponding jump instruction block, and a register rn represents a second register used by a first load effective address instruction of a to-be-jumped-to thread, where the leaxxj instruction is used to instruct to store, when a condition is satisfied, an instruction address corresponding to L_loop_i into the register rm, and store, when a condition is not satisfied, instruction addresses of the first instructions after the leaxxj instruction into the register rn, and jump to an instruction corresponding to an address stored in the register m.

Optionally, in an example of the foregoing aspect, the second register has a flag bit used to indicate a status of the second register, and the status includes a first state indicating normal use and a second state indicating that the register points to another register; and when a machine instruction is running, if the processing core identifies that a specified value is assigned to L_loop_i in the leaxxj instruction, the processing core releases a physical register corresponding to the processing core, causing the second register rn to point to a second register used by a target thread to jump to, and a value is assigned to a flag bit of the second register rn to indicate the second state.

Optionally, in an example of the foregoing aspect, when a machine instruction is running, if the processing core has fetched the leaxxj instruction, the processing core prefetches an instruction block corresponding to an address stored in the register rn in the leaxxj instruction into an instruction decoding queue of the processing core.

According to still another aspect of the implementations of the present specification, a computing device is provided, including: one or more processors; and a memory coupled to the one or more processors, where the memory stores an instruction, and when the instruction is executed by the one or more processors, the at least one or more processors perform the multi-thread processing method described above.

According to yet another aspect of the implementations of the present specification, a machine-readable storage medium that stores an executable instruction is provided, and when the instruction is executed, a machine performs the multi-thread processing method described above.

BRIEF DESCRIPTION OF DRAWINGS

With reference to the following accompanying drawings, further understanding of the essence and advantages of the content of the implementations of the present specification can be implemented. In the accompanying drawings, similar components or features can have the same reference numeral.

FIG. 2 is a schematic diagram illustrating an example of compiling a plurality of threads, according to the existing technology;

FIG. 6 is a schematic diagram illustrating an example of thread fusion, according to an implementation of the present specification;

FIG. 7 is a schematic diagram illustrating another example of thread fusion, according to an implementation of the present specification;

DESCRIPTION OF IMPLEMENTATIONS

The subject described in the present specification will be discussed with reference to example implementations. It should be understood that these implementations are merely discussed to enable a person skilled in the art to better understand and implement the subject described in the present specification, and are not intended to limit the protection scope, applicability, or examples described in the claims. Functions and arrangements of the discussed elements can be changed without departing from the protection scope of the content of the implementations of the present specification. In the examples, various processes or components can be omitted, replaced, or added as needed. For example, the described method can be performed in a different sequence from the described sequence, and steps can be added, omitted, or combined. In addition, features described in relation to some examples can also be combined in other examples.

As used in the present specification, the term "include" and its variants denote an open term and indicate "including but not limited to". The term "based on" indicates "at least based on". The terms "one implementation" and "an implementation" indicate "at least one implementation". The term "another implementation" indicates "at least one other implementation". The terms "first", "second", etc. can indicate different objects or the same object. Other definitions can be included below, whether explicit or implicit. Unless explicitly stated in the context, the definition of a term is consistent throughout the specification.

Figure 1:
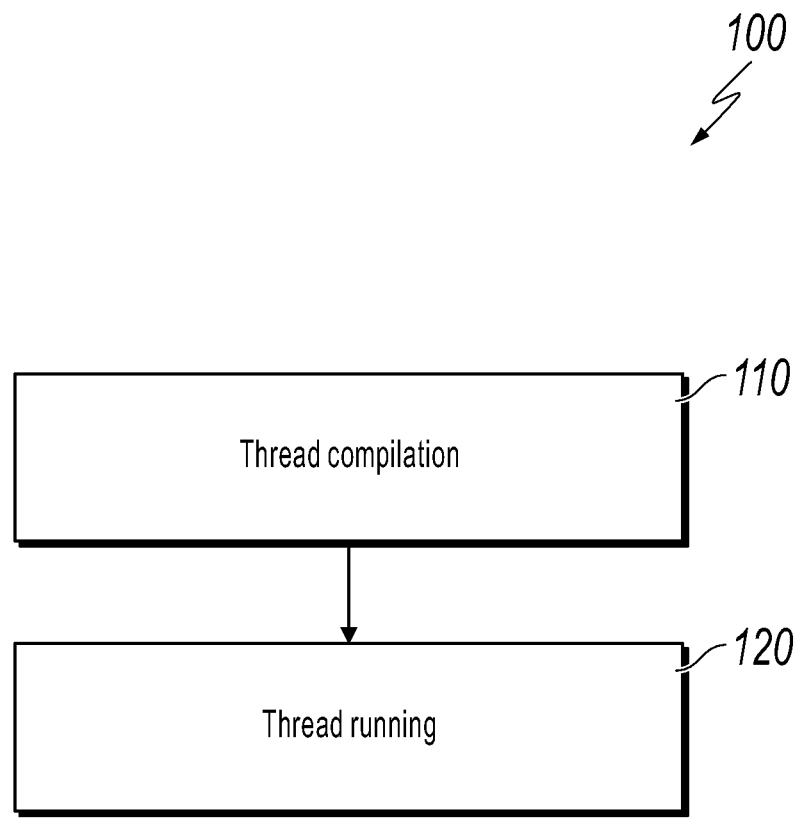
FIG. 1 is a schematic diagram illustrating a multi-thread processing process, according to the existing technology.

FIG. 1 is a schematic diagram illustrating a multi-thread processing process 100, according to the existing technology.

As shown in FIG. 1, the multi-thread processing process 100 includes a thread compilation process 110 and a thread running process 120.

In the thread compilation process 110, a plurality of to-be-processed threads are compiled by using a same register set, to obtain corresponding machine instruction codes. Here, a register is a register used in a program code, and the register points to a physical register.

FIG. 2 is a schematic diagram illustrating an example of compiling a plurality of threads, according to the existing technology. FIG. 2 shows three threads: Thread 1, Thread 2, and Thread 3. As shown in FIG. 2, Thread 1, Thread 2, and Thread 3 are compiled by using a same register set {r1, r2, r3, r4, ... }. Thread 1 uses registers r1 to r3, Thread 2 uses registers r1 and r3, and Thread 3 uses registers r1, r2, and r4.

In the implementation of the present specification, each machine instruction includes an operation code and an operand, and the operation code is used to indicate a nature and a function of an operation to be completed by the instruction, for example, add, mul, mov, sub, and jmp. The operand is used to indicate an operation object when the operation code is executed. The operand can be in a form of data, or can be an address of a memory cell that stores data or a name of a register that stores data. The operand includes a source operand and a destination operand. The source operand indicates a source of an operand that participates in an operation, and a destination operand address indicates an address of a storage unit that stores an operation result or a name of a register that stores an operation result.

In addition, a processing core (for example, a central processing unit (CPU)) also creates an independent thread running environment for each of a plurality of threads. The thread running environment includes a hardware resource used for instruction prediction, a hardware resource used for instruction execution, a hardware resource used for instruction submission, etc. In addition, the processing core further creates a respective hardware instruction decoding queue for each of the plurality of threads.

In the thread running process 120, the CPU accesses and decodes an instruction through polling in each instruction cycle based on thread data, and stores the instruction into a respective hardware instruction decoding queue after accessing and decoding the instruction. In addition, in each instruction cycle, a CPU execution unit obtains a decoded instruction from each hardware instruction decoding queue through polling, and then stores the decoded instruction into the CPU execution unit to start running.

Figure 3:
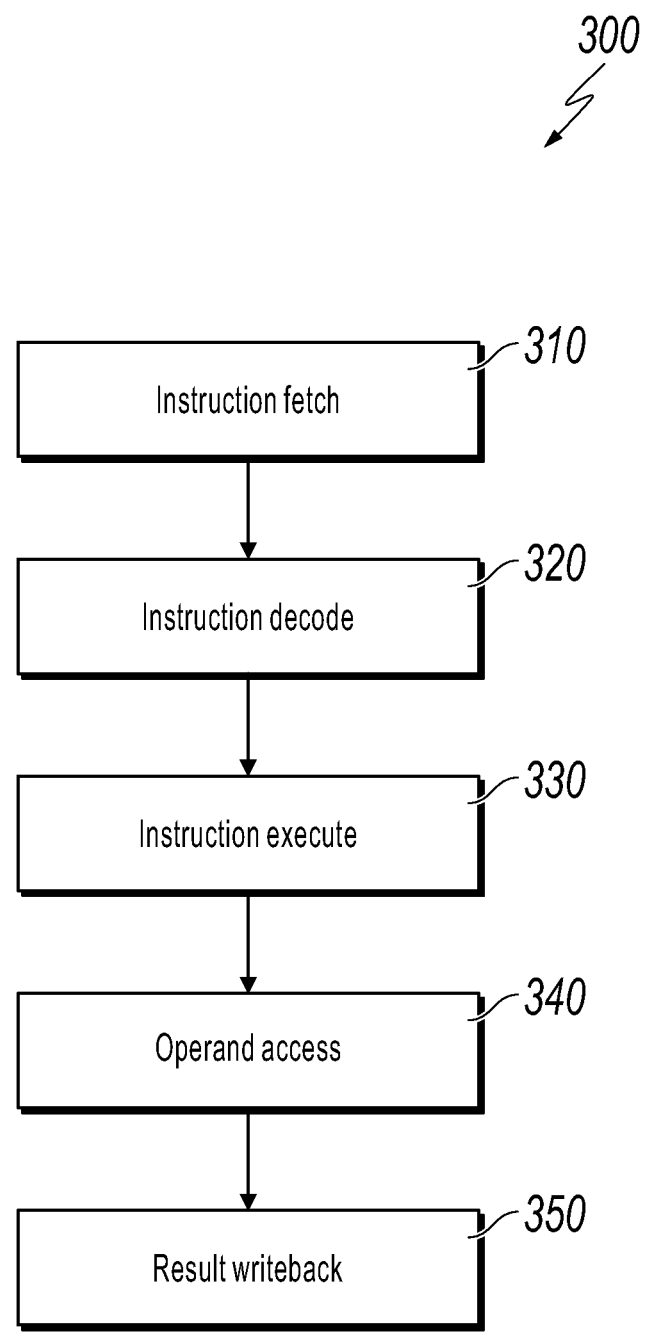
FIG. 3 is a schematic diagram illustrating an example of an instruction running process.

FIG. 3 is a schematic diagram illustrating an example of an instruction running process.

As shown in FIG. 3, at block 310, an instruction fetch (IF) operation is performed. The instruction fetch operation is to fetch a to-be-run instruction from a main memory into an instruction register. A value in a program counter (PC) is used to indicate a position of a current instruction in the main memory. After an instruction is fetched, the value in the PC increases automatically based on a length of an instruction field. If the instruction is an instruction of a single word length, one byte is increased. If the instruction is an instruction of a double word length, two bytes are increased, and so on.

After the to-be-run instruction is fetched, at block 320, an instruction decode (ID) operation is performed. In the instruction decode operation, an instruction decoder splits and interprets the fetched instruction based on a predetermined instruction format, and identifies different instruction categories and various methods for obtaining an operand. In a computer controlled by combinatorial logic, the instruction decoder generates different control potentials for different instruction operation codes, to form different micro operation sequences. In a computer controlled by a microprogram, the instruction decoder uses an instruction operation code to find an entry of a microprogram that executes the instruction, and starts execution from the entry.

After the instruction decode operation is completed, at block 330, an instruction execution (EX) operation is performed. In the instruction execution operation, various operations specified in the instruction are completed to implement a function of the instruction. Therefore, different components of the CPU are connected to perform needed operations. For example, if an addition operation needs to be completed, an arithmetic logic unit (ALU) is connected to a group of inputs and a group of outputs, an input end provides values that need to be added up, and an output end includes a final operation result.

In addition, optionally, at block 340, an operand access operation is performed based on an instruction need. In the operand access operation, an address of an operand in the main memory is obtained based on an instruction address code, and the operand is read from the main memory for an operation.

After the instruction is running, at block 350, a result writeback (WB) operation is performed. In the result writeback operation, running result data of the instruction execution operation is "written back" to a storage unit. For example, the result data is often written to an internal register of the CPU, so that the result data is quickly accessed by subsequent instructions. In some cases, the result data can also be written to a main memory that is relatively slow but is relatively cheap and has a relatively large capacity. Many instructions also change states of flag bits in a program status field register, and the flag bits are used to identify different operation results and can be used to affect a program action.

After the instruction is executed and a result data writeback operation is completed, if no unexpected event (for example, result overflow) occurs, the processing core obtains a next instruction address from the PC, and starts a new instruction running process.

FIG. 3 is a schematic diagram illustrating an instruction running process in a single thread. In a multi-thread processing mechanism, an operating system uses a thread scheduling mechanism to switch between a plurality of threads. For example, the operating system allocates a time slice to each of a plurality of threads that are allowed to be executed in parallel by a CPU, and each thread occupies the CPU in the respective time slice to run an instruction. After a time slice of a current thread is used, the time slice is in a ready state, and the CPU is released to another thread for occupation. In addition, if a task of a thread is blocked or ends before a time slice of the thread ends, thread switching is performed immediately, and no CPU resource is wasted.

In addition, a hyperthread mechanism can also be used to implement multi-thread processing. The hyperthread mechanism is that when an integer quantity of instruction sets are executed in a thread, a task executed by another thread is a task executed by an execution unit different from an execution unit that executes a task of the current thread, for example, a floating-point instruction set. In this case, the two threads can be executed at the same time. A hyperthread technology allows two threads to use resources in the CPU at the same time without collisions.

In the foregoing multi-thread processing solution, the CPU needs to prepare an independent hardware running environment for each thread to run the thread, and therefore, more hardware costs are needed. A larger quantity of threads running in the multi-thread processing mechanism leads to larger hardware costs that need to be increased. In such a multi-task processing solution, a quantity of threads processed in parallel is limited by a hardware condition used for processing a thread.

To resolve the foregoing problem, an implementation of the present specification provides a multi-thread processing solution. In the multi-thread processing solution, a plurality of threads are separately compiled by using different register sets, the plurality of threads are fused into a single fused thread by using load effective address instructions and control transfer instructions in an instruction set supported by a processing core, and then running is performed based on the obtained fused thread, thereby implementing multi-thread processing. In this case, only hardware costs needed to run a single thread need to be provided, so that multi-thread processing can be implemented without increasing hardware costs.

Figure 4:
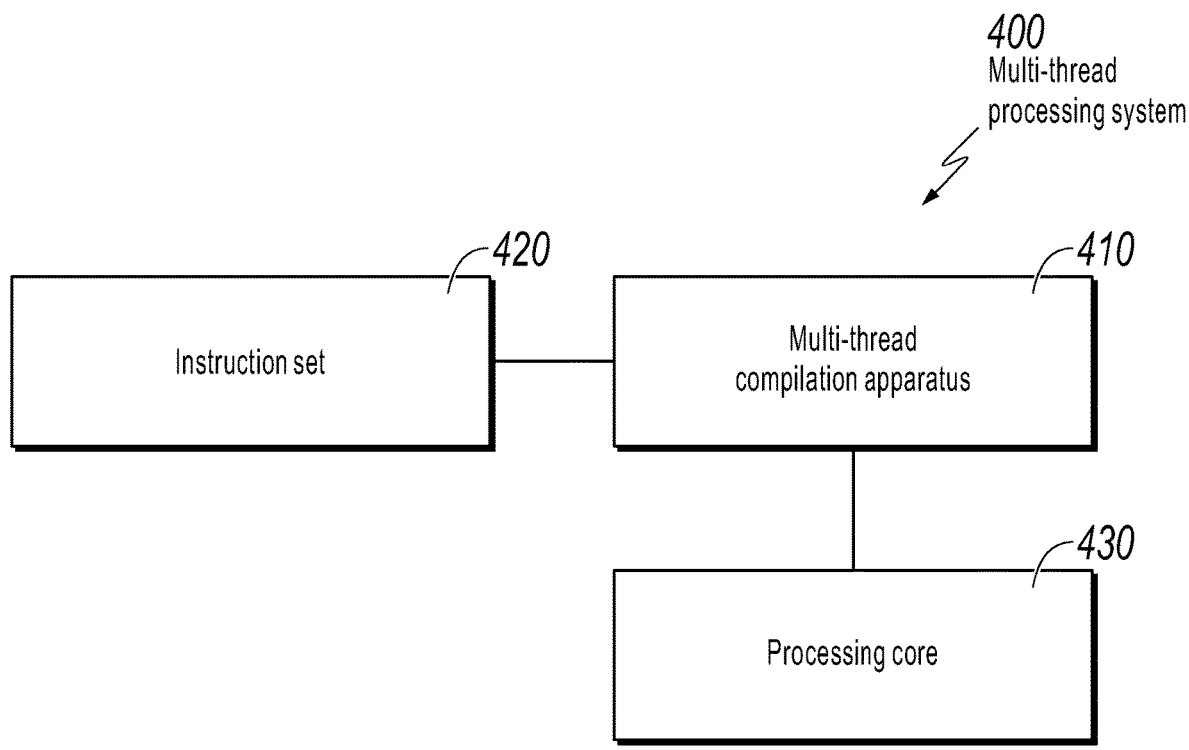
FIG. 4 is a block diagram illustrating a multi-thread processing system, according to an implementation of the present specification.

FIG. 4 is a block diagram illustrating a multi-thread processing system 400, according to an implementation of the present specification. As shown in FIG. 4, the multi-thread processing system 400 includes a multi-thread compilation apparatus 410, an instruction set 420, and a processing core 430.

The multi-thread compilation apparatus 410 is configured to separately compile threads in a first quantity of to-beprocessed threads by using different first register sets, to obtain machine instruction codes of the threads, and fuse the machine instruction codes of the threads by using first instructions in the instruction set 420 supported by the processing core, to obtain a machine instruction code of a single fused thread. The obtained machine instruction code of the single fused thread is obtained by the processing core 430 to run an instruction. Here, the first instructions include load effective address instructions (Lea instruction) and control transfer instructions, the load effective address instructions and the control transfer instructions are compiled by using a second register different from the first register set, and the control transfer instructions are set in the machine instruction codes corresponding to the threads, to implement jump operations between the machine instruction codes of the threads. Operations and structures of the multi-thread compilation apparatus 410 are described in detail below with reference to FIG. 5 to FIG. 7 and FIG. 9.

It should be noted here that both the first register set and the second register are registers available to the processing core 430. In the implementations of the present specification, the first register set and the second register can be obtained by dividing the registers available to the processing core 430.

The processing core 430 is configured to obtain a machine instruction in the fused thread in units of instruction blocks for running. In an example of the implementations of the present specification, a size of the instruction block is determined by a capability of the processing core to read instructions in a single instruction cycle. In addition, when an obtained instruction block includes at least one control transfer instruction and an end instruction of the instruction block is not a control transfer instruction, the instruction block can be adjusted to an instruction block that uses the control transfer instructions as an end instruction. Operations of the processing core 430 are described in detail below with reference to FIG. 8.

Figure 5:
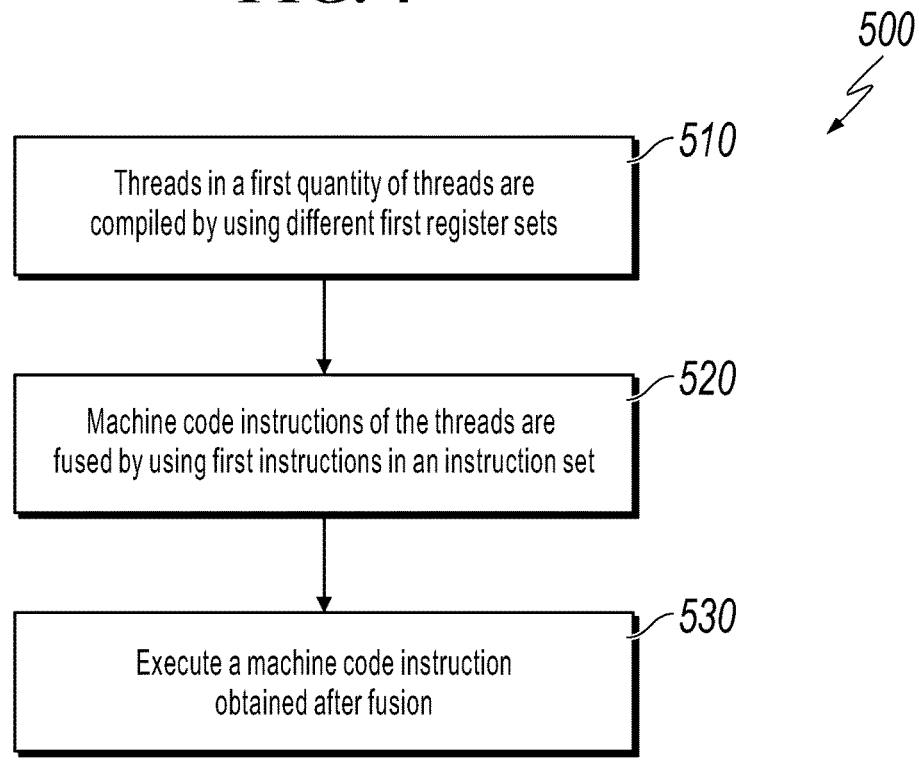
FIG. 5 is a flowchart illustrating a multi-thread processing method, according to an implementation of the present specification.

FIG. 5 is a flowchart illustrating a multi-thread processing method, according to an implementation of the present specification.

As shown in FIG. 5, at block 510, threads in a first quantity of to-be-processed threads are compiled by using different first register sets, to obtain corresponding machine instruction codes. In the implementation of the present specification, that the register sets are different means that all registers included in the register sets are different. In addition, the register set is obtained by dividing registers available to a processing core. For example, assuming that the registers available to the processing core include registers r1 to r10, and the register set is obtained by dividing the registers r1 to r10. In an example of the implementation of the present specification, the first quantity is set to be no more than a first predetermined threshold. The first predetermined threshold is determined based on a quantity of registers available to the processing core. For example, the first predetermined threshold can be determined based on the quantity of registers available to the processing core and a quantity of registers needed by the to-be-processed threads. In addition, in another example of the implementation of the present specification, the first quantity can be arbitrarily set by using software. In this case, if the specified first quantity exceeds the quantity of registers available to the processing core or the quantity of registers needed by the first quantity of threads exceeds the quantity of registers available to the processing core, threads are compiled by pushing the threads into a stack.

FIG. 6 is a schematic diagram illustrating an example of thread fusion, according to an implementation of the present specification. FIG. 7 is a schematic diagram illustrating another example of thread fusion, according to an implementation of the present specification. FIG. 6 and FIG. 7 show fusion of Thread 1, Thread 2, and Thread 3 shown in FIG. 2. In FIG. 6, Thread 1 is compiled by using a first register set including registers r1 to r3, Thread 2 is compiled by using a first register set including registers r8 and r9, and Thread 3 is compiled by using a first register set including registers r12 to r14. In FIG. 7, Thread 1 is compiled by using a first register set including registers r1 to r3, Thread 2 is compiled by using a first register set including registers r8 and r9, and Thread 3 is compiled by using a first register set including registers r11 to r13.

After the machine instruction codes of the threads are obtained above, at block 520, the machine instruction codes of the threads are fused by using first instructions in an instruction set 420 supported by the processing core, to obtain a machine instruction code of a single fused thread. Here, the first instructions include load effective address instructions (Lea instruction) and control transfer instructions, the load effective address instructions and the control transfer instructions are compiled by using a second register different from the first register set, and the control transfer instructions are set in the machine instruction codes corresponding to the threads, to implement jump operations between the machine instruction codes of the threads.

The load effective address instructions are also referred to as an LEA instruction, and is an instruction of a microcomputer 8086/8088 series. An instruction format of the LEA instruction is: LEA operand A, operand B. An instruction function of the LEA instruction is to transfer a valid address of the operand B to a unit corresponding to the operand A. Here, the operand A is a destination operand, and the operand B is a source operand. The LEA instruction requires the source operand B to be a storage unit and the destination operand A to be a register.

For example, in the solution shown in FIG. 6, registers r4 and r5 are used as second registers to compile first instructions related to Thread 1, registers r6 and r7 are used as second registers to compile first instructions related to Thread 2, and registers r10 and r11 are used as second registers to compile first instructions related to Thread 3. In the solution shown in FIG. 7, a register r4 is used as a second register to compile first instructions related to Thread 1, a register r6 is used as a second register to compile first instructions related to Thread 2, and a register r10 is used as a second register to compile first instructions related to Thread 3. How to use the first instructions for fusion will be described below with reference to the examples in FIG. 6 and FIG. 7.

For example, the control transfer instructions include a first control transfer instruction obtained by modifying some or all jump instructions in the machine instruction codes of the threads. For example, in FIG. 6, control transfer instructions "1.10 cmovbe r5, r4" and "1.11 jmp r6" are obtained by modifying a jump instruction "1.6 ja L_loop_1" in Thread 1 in FIG. 2, and control transfer instructions "1.21 cmovbe r5, r4" and "1.22 jmp r6" are obtained by modifying a jump instruction "1.14 jbe L_loop_2" in Thread 1 in FIG. 2, but a jump instruction "1.9 ja L_sub_again" in Thread 1 in FIG. 2 is not modified. Control transfer instructions "2.9 cmovbe r7, r6" and "2.10 jmp r10" are obtained by modifying all jump instructions "2.7 ja L_loop_3" in Thread 2 in FIG. 2. Control transfer instructions "3.8 cmovbe r11, r10" and "3.9 jmp r4" are obtained by modifying all jump instructions "3.6 ja L_loop_4" in Thread 3 in FIG. 2. In the example shown in FIG. 6, the control transfer instructions include a conditional move instructions cmovbe and an unconditional jump instructions jmp. It should be noted here that the cmovbe instruction shown in FIG. 6 is merely an example. In another example of the implementation of the present specification, the conditional move instructions can include a cmovle instruction, a cmovnz instruction, etc.

In FIG. 7, a control transfer instruction "1.8 leaaj L_loop_1(r4), r6" is obtained by modifying a jump instruction "1.6 ja L_loop_1" in Thread 1 in FIG. 2, and a control transfer instruction "1.16 leaaj L_loop_2(r4), r6" is obtained by modifying a jump instruction "1.14 jbe L_loop_2" in Thread 1 in FIG. 2. Similarly, a jump instruction "1.9 ja L_sub_again" in Thread 1 in FIG. 2 is not modified. A control transfer instruction "2.7 leaaj L_loop_3(r6), r10" is obtained by modifying a jump instruction "2.7 ja L_loop_3" in Thread 2 in FIG. 2. A control transfer instruction "3.6 leaaj L_loop_4(r10), r4" is obtained by modifying a jump instruction "3.6 ja L_loop_4" in Thread 3 in FIG. 2. Here, the leaaj instruction is a conditional move instruction. A specific structure and meaning of the leaaj instruction are described below.

In this example, an existing jump instruction in the machine instruction codes of the threads is modified to obtain control transfer instructions used to fuse threads, so that a quantity of instructions in the fused thread can be reduced, thereby improving efficiency of the fused thread.

In addition, for another example, the control transfer instructions include a second control transfer instruction added based on control transfer instructions adding rules. Here, the second control transfer instruction is not obtained by modifying an original instruction in each thread, but is a new instruction. For example, assuming that none of Thread 1, Thread 2, and Thread 3 includes a jump instruction, or an instruction interval between jump instructions included in at least one of Thread 1, Thread 2, and Thread 3 is too large (for example, exceeds a predetermined quantity such as a quantity of instructions that the processing core can execute in a single instruction cycle), a second conditional move instruction can be added to a corresponding thread based on the control transfer instruction adding rules.

In the implementation of the present specification, the control transfer instruction adding rules can include at least one of the following: making an interval between the control transfer instructions no more than a second predetermined quantity of instructions; and adding the second control transfer instructions after a suitable machine instruction by using an instruction compiler tuning policy. Here, the second predetermined quantity can be determined based on the quantity of instructions that the processing core can execute in the single instruction cycle.

In the implementation of the present specification, "making an interval between the control transfer instructions no more than a second predetermined quantity of instructions" means that the interval between control transfer instructions (the first control transfer instructions and/or the second control transfer instructions) in the threads does not exceed the second predetermined quantity of instructions.

"Adding the second control transfer instructions after a suitable machine instruction by using an instruction compiler tuning policy" means determining, by using a cyclic test policy, control transfer instructions adding manner that can maximize efficiency of a compiler.

In this example, when there is no jump instruction in an unfused thread, if control transfer instructions are added based on the control transfer instruction adding rules, a fused thread ca jump at a proper time, thereby improving running efficiency of the fused thread.

In addition, after being fused, each fused thread has at least one jump instruction block obtained through segmentation based on the control transfer instructions. For example, in the fusion solution in FIG. 6, there are two jump instruction blocks for Thread 1, that is, a first jump instruction block from an instruction "L_loop_1:1.6 add (addr1), r1" to an instruction "1.11 jmp r6", and a second jump instruction block from an instruction "L_loop_2:1.17 sub (addr1), r4" to an instruction "1.22 jmp r6". There is one jump instruction block for Thread 2, that is, a third jump instruction block from an instruction "L_loop_3:2.5 add (addr2), r8" to an instruction "2.10 jmp r10". There is one jump instruction block for Thread 3, that is, a fourth jump instruction block from an instruction "L_loop_4:3.4 sub (addr3), r14" to an instruction "3.9 jmp r4".

In an example of the fusion processing solution in the implementation of the present specification, as shown in FIG. 6, for each thread other than first threads in the first quantity of threads, the load effective address instructions include a single first load effective address instruction, and all first load effective address instructions are placed at the beginning of the machine instruction code of the fused thread, and are used to move an address of the first instructions of the thread to a corresponding second register. For example, FIG. 6 shows first load effective address instructions "1.1 lea r6, L_Thread2(rip)" and "1.2 lea r10, L_Thread3(rip)". The first load effective address instruction "1.1 lea r6, L_Thread2(rip)" corresponds to Thread 2, and the first load effective address instruction "1.2 lea r10, L_Thread3(rip)" corresponds to Thread 3.

In addition, in the example shown in FIG. 6, for each jump instruction block in each thread in the first quantity of threads, the load effective address instructions include two second load effective address instructions, where one second load effective address instruction is used to move an address of the first instructions of the jump instruction block to a corresponding second register, the other second load effective address instruction is used to move an address of the first instructions after the jump instruction block to a corresponding second register, the two second load effective address instructions are placed between a jump instruction block corresponding to a respective thread and a previous jump instruction block, and the control transfer instructions include conditional move instructions and unconditional jump instructions.

As shown in FIG. 6, for a first jump instruction block in Thread 1, there are two second load effective address instructions "1.4 lea r5, Leave_loop_1(rip)" and "1.5 lea r4 L_loop_1(rip)". To be specific, an address of an instruction "L_loop_1: 1.6 add (addr1), r1" (that is, an instruction corresponding to L_loop_1) is transferred (stored) to a register r4, and an instruction "Leave_loop_1: L_sub_again 1.12 sub r1, r3" (that is, an instruction corresponding to Leave_loop_1) is transferred (stored) to a register r5. In addition, the two second load effective address instructions are placed before the instruction "L_loop_1:1.6 add (addr1), 0". For the second jump instruction block in Thread 1, there are two second load effective address instructions "1.15 lea r5, Leave_loop_2(rip)" and "1.16 lea r4 L_loop_2(rip)", that is, an address of an instruction "L_loop_2: 1.17 sub (addr1), r4" is transferred (stored) to the register r4, and an address of an instruction "Leave_loop_2 . . . " is transferred (stored) to the register r5. In addition, the two second load effective address instructions are placed between the instruction "Leave_loop_1: L_sub_again" and the instruction "L_loop_2: 1.17 sub (addr1), r4", that is, between the first jump instruction block and the second jump instruction block. Generally, the two second load effective address instructions are preferably placed near the first instructions of a corresponding jump instruction block.

For the third jump instruction block in Thread 2, there are two second load effective address instructions "2.1 lea r7, Leave_loop_3(rip)" and "2.2 lea r6 L_loop_3(rip)", that is, an address of an instruction "L_loop_3: 2.5 add (addr2), r8" is transferred (stored) to the register r6, and an address of an instruction "Leave_loop_3: 2.11 add $9, r9" is transferred (stored) to the register r7. In addition, the two second load effective address instructions are placed before an instruction "L_loop_3: 2.5 add (addr2), r8", that is, before the third jump instruction block of Thread 2.

For the fourth jump instruction block in Thread 3, there are two second load effective address instructions "3.1 lea r11, Leave_loop_4(rip)" and "3.2 lea r10 L_loop_4(rip)", that is, an address of an instruction "L_loop_4: 3.4 sub (addr3), r14" is transferred (stored) to the register r10, and an address of an instruction "Leave_loop_4: . . . " is transferred (stored) to the register r11. In addition, the two second load effective address instructions are placed before an instruction "L_loop_4: 3.4 sub (addr3), r14", that is, before the fourth jump instruction block of Thread 3.

In the example in FIG. 6, for each jump instruction block in each thread in the first quantity of threads, the control transfer instructions include a conditional move instruction cmovbe and an unconditional jump instruction jmp. For example, for the first jump instruction block in Thread 1, the control transfer instructions include a conditional move instruction "1.10 cmovbe r5, r4" and an unconditional jump instruction "1.11 jmp r6". For the second jump instruction block in Thread 1, the control transfer instructions include a conditional move instruction "1.21 cmovbe r5, r4" and an unconditional jump instruction "1.22 jmp r6". For the third jump instruction block in Thread 2, the control transfer instructions include a conditional move instruction "2.9 cmovbe r7, r6" and an unconditional jump instruction "2.10 jmp r10". For the fourth jump instruction block in Thread 3, the control transfer instructions include a conditional move instruction "3.8 cmovbe r11, r10" and an unconditional jump instruction "3.9 jmp r4".

According to the thread fusion solution shown in FIG. 6, machine instruction codes of a plurality of threads can be integrated into a machine instruction code of a single thread. Therefore, when an instruction is executed, only a hardware running environment corresponding to the single thread needs to be prepared, so that multi-thread processing can be implemented without increasing hardware costs.

It should be noted that in the thread fusion solution shown in FIG. 6, because the processing core does not know about a jump destination register before the jump instruction, the register needs to be predicted.

In another example of the fusion processing solution in the implementation of the present specification, as shown in FIG. 7, the instruction set 420 includes leaxxj instructions. Correspondingly, for each thread other than first threads in the first quantity of threads, the load effective address instructions include a single first load effective address instruction, and the first load effective address instruction is used to move an address of the first instructions of the thread to a corresponding second register. For example, FIG. 7 shows first load effective address instructions "1.1 lea r6, L_Thread2(rip)" and "1.2 lea r10, L_Thread3(rip)". The first load effective address instruction "1.1 lea r6, L_Thread2(rip)" corresponds to Thread 2, and the first load effective address instruction "1.2 lea r10, L_Thread3(rip)" corresponds to Thread 3. In addition, the first load effective address instruction "1.1 lea r6, L_Thread2(rip)" and "1.2 lea r10, L_Thread3(rip)" are placed at the beginning of the fused thread.

In addition, for each jump instruction block in each thread in the first quantity of threads, the control transfer instructions include a single leaxxj instruction.

Here, the leaxxj instruction is a new conditional move instruction in the instruction set of the CPU. An instruction format of the leaxxj instruction is leaxxj L_loop_i(rm), rn, where a register rm represents a second register used by a first load effective address instruction of a thread including a corresponding jump instruction block, and a register rn represents a second register used by a first load effective address instruction of a to-be-jumped-to thread. The leaxxj instruction is used to instruct to store, when a condition is satisfied, an instruction address corresponding to L_loop_i into the register rn, and put, when a condition is not satisfied, instruction addresses of the first instructions after the leaxxj instruction into the register rn, and (unconditionally) jump to an instruction corresponding to an address stored in the register rn. Based on different condition determining manners, the leaxxj instruction includes a leaaj instruction, a leaaej instruction, a leabj instruction, a leabej instruction, a leagj instruction, a leagej instruction, a lealej instruction, a lealj instruction, a leanej instruction, a leaej instruction, a leaj instruction, a leancj instruction, a leacj instruction, etc.

A format of the leaaj instruction is leaaj L_Loop_i(rn), rm, and is used to indicate that if there is no symbol ">", an instruction address indicated by L_Loop_i is stored in the register rn; otherwise, an address of an instruction subsequent to the current leaaj instruction is stored in the register rn, and jumps to the register rn at the same time.

For example:
sub r1, r2
leaaj L_Loop_i(rn), rm

The leaaj instruction indicates that there is no symbol to compare r2 and r1. If r2 is greater than r1, the instruction address indicated by L_Loop_i is stored in rn. Otherwise, the address of the instruction subsequent to the current leaaj instruction is stored in rn, and jumps to rm at the same time.

A format of the leaaej instruction is leaaej L_Loop_i(rn), rm, and is used to indicate that if there is no symbol ">", an instruction address indicated by L_Loop_i is stored in the register rn. Otherwise, an address of an instruction subsequent to the current leaaej instruction is stored in the register rn, and jumps to the register rn at the same time.

For example:
sub r1, r2
leaaej L_Loop_i(rn), rm

The leaaej instruction indicates that there is no symbol to compare r2 and r1. If r2 is greater than or equal to r1, the instruction address indicated by L_Loop_i is stored in rn. Otherwise, the address of the instruction subsequent to the current leaaej instruction is stored in rn, and jumps to rm at the same time.

A format of the leabj instruction is leabj L_Loop_i(rn), rm, and is used to indicate that if there is no symbol "<", an instruction address indicated by L_Loop_i is stored in the register rn. Otherwise, an address of an instruction subsequent to the current leabj instruction is stored in the register rn, and jumps to the register rn at the same time.

For example:
sub r1, r2
leabj L_Loop_i(rn), rm

The leabj instruction indicates that there is no symbol to compare r2 and r1. If r2 is less than r1, the instruction address indicated by L_Loop_i is stored in rn. Otherwise, the address of the instruction subsequent to the current leabj instruction is stored in rn, and jumps to rm at the same time.

A format of the leabej instruction is leabej L_Loop_i(rn), rm, and is used to indicate that if there is no symbol "<", an instruction address indicated by L_Loop_i is stored in the register rn. Otherwise, an address of an instruction subsequent to the current leabej instruction is stored in the register rn, and jumps to the register rm at the same time.

For example:
sub r1, r2
leabej L_Loop_i(rn), rm

The leabej instruction indicates that there is no symbol to compare r2 and r1. If r2 is less than or equal to r1, the instruction address indicated by L_Loop_i is stored in rn. Otherwise, the address of the instruction subsequent to the current leabej instruction is stored in rn, and jumps to rm at the same time.

A format of the leagj instruction is leagj L_Loop_i(rn), rm, and is used to indicate that if there is a symbol ">", an instruction address indicated by L_Loop_i is stored in the register rn. Otherwise, an address of an instruction subsequent to the current leagj instruction is stored in the register rn, and jumps to the register rm at the same time.

For example:
sub r1, r2
leagj L_Loop_i(rn), rm

The leagj instruction indicates that there is a symbol to compare r2 and r1. If r2 is greater than r1, the instruction address indicated by L_Loop_i is stored in rn. Otherwise, the address of the instruction subsequent to the current leagj instruction is stored in rn, and jumps to rm at the same time.

A format of the leagej instruction is leagej L_Loop_i(rn), rm, and is used to indicate that if there is a symbol ">", an instruction address indicated by L_Loop_i is stored in the register rn. Otherwise, an address of an instruction subsequent to the current leagej instruction is stored in the register rn, and jumps to the register rm at the same time.

For example:
sub r1, r2
leagej L_Loop_i(rn), rm

The leagej instruction indicates that there is a symbol to compare r2 and r1. If r2 is greater than or equal to r1, the instruction address indicated by L_Loop_i is stored in rn. Otherwise, the address of the instruction subsequent to the current leagej instruction is stored in rn, and jumps to rm at the same time.

A format of the lealej instruction is lealej L_Loop_i(rn), rm, and is used to indicate that if there is a symbol "<", an instruction address indicated by L_Loop_i is stored in the register rn. Otherwise, an address of an instruction subsequent to the current lealej instruction is stored in the register rn, and jumps to the register rm at the same time.

For example:
sub r1, r2
lealej L_Loop_i(rn), rm

The lealej instruction indicates that there is a symbol to compare r2 and r1. If r2 is less than or equal to r1, the instruction address indicated by L_Loop_i is stored in rn. Otherwise, the address of the instruction subsequent to the current lealej instruction is stored in rn, and jumps to rm at the same time.

A format of the lealj instruction is lealj L_Loop_i(rn), rm, and is used to indicate that if there is a symbol "<", an instruction address indicated by L_Loop_i is stored in the register rn. Otherwise, an address of an instruction subsequent to the current lealj instruction is stored in the register rn, and jumps to the register rm at the same time.

For example:
sub r1, r2
lealj L_Loop_i(rn), rm

The lealj instruction indicates that there is a symbol to compare r2 and r1. If r2 is less than r1, the instruction address indicated by L_Loop_i is stored in rn. Otherwise, the address of the instruction subsequent to the current lealj instruction is stored in rn, and jumps to rm at the same time.

A format of the leanej instruction is leanej L_Loop_i(rn), rm, and is used to indicate "≠", an instruction address indicated by L_Loop_i is stored in the register rn. Otherwise, an address of an instruction subsequent to the current leanej instruction is stored in the register rn, and jumps to the register rm at the same time.

For example:
sub r1, r2
leanej L_Loop_i(rn), rm

The leanej instruction indicates that there is a symbol to compare r2 and r1. If r2 is not equal to r1, the instruction address indicated by L_Loop_i is stored in rn. Otherwise, the address of the instruction subsequent to the current leanej instruction is stored in rn, and jumps to rm at the same time.

A format of the leaej instruction is leaej L_Loop_i(rn), rm, and is used to indicate that "=", an instruction address indicated by L_Loop_i is stored in the register rn. Otherwise, an address of an instruction subsequent to the current leaej instruction is stored in the register rn, and jumps to the register rm at the same time.

For example:
sub r1, r2
leaej L_Loop_i(rn), rm

The leaej instruction indicates that there is a symbol to compare r2 and r1. If r2 is equal to r1, the instruction address indicated by L_Loop_i is stored in rn. Otherwise, the address of the instruction subsequent to the current leaej instruction is stored in rn, and jumps to rm at the same time.

A format of the leaj instruction is leaj L_Loop_i(rn), rm, and is used to unconditionally store an instruction address indicated by L_Loop_i in the register rn and jumps to the register rm at the same time.

For example:
sub r1, r2
leaj L_Loop_i(rn), rm

The leaj instruction indicates that the instruction address indicated by L_Loop_i is unconditionally stored in rn, and jumps to rm at the same time.

A format of the leancj instruction is leancj L_Loop_i(rn), rm, and is used to indicate "no carry", an instruction address indicated by L_Loop_i is stored in the register rn. Otherwise, an address of an instruction subsequent to the current leancj instruction is stored in the register rn, and jumps to the register rm at the same time.

For example:
sub r1, r2
leancj L_Loop_i(rn), rm

The leancj instruction indicates that there is a symbol to compare r2 and r1. If no carry is generated, the instruction address indicated by L_Loop_i is stored in rn. Otherwise, the address of the instruction subsequent to the current leancj instruction is stored in rn, and jumps to rm at the same time.

A format of the leacj instruction is leacj L_Loop_i(rn), rm, and is used to indicate "carry", an instruction address indicated by L_Loop_i is stored in the register rn. Otherwise, an address of an instruction subsequent to the current leacj instruction is stored in the register rn, and jumps to the register rm at the same time.

For example:
sub r1, r2
leacj L_Loop_i(rn), rm

The leacj instruction indicates that there is a symbol to compare r2 and r1. If no carry is generated, the instruction address indicated by L_Loop_i is stored in rn. Otherwise, the address of the instruction subsequent to the current leacj instruction is stored in rn, and jumps to rm at the same time.

Correspondingly, to ensure that an instruction function of the added leaxxj instruction can be successfully executed, an architecture of the CPU needs to be modified. For example, the CPU can identify the leaxxj instruction and complete various operation tasks of the leaxxj instruction.

In addition, for each instruction block in each thread, the control transfer instructions include a single leaxxj instruction. For example, for the first instructions block in Thread 1, the control transfer instructions include an instruction "1.8 leaaj L_loop_1(r4), r6". For the second instruction block in Thread 1, the control transfer instructions include an instruction "1.16 leaaj L_loop_2(r4), r6". For the third instruction block in Thread 2, the control transfer instructions include an instruction "2.7 leaaj L_loop_3(r6), r10". For the fourth instruction block in Thread 3, the control transfer instruction includes an instruction "3.6 leaaj L_loop_4(r10), r4".

According to the thread fusion solution shown in FIG. 7, machine instruction codes of a plurality of threads can be integrated into a machine instruction code of a single thread. Therefore, when an instruction is executed, only a hardware running environment corresponding to the single thread needs to be prepared, so that multi-thread processing can be implemented without increasing hardware costs.

In addition, in the example shown in FIG. 7, a single instruction can be used to move an instruction, so that a quantity of instructions of the fused thread is greatly reduced, thereby improving efficiency of the fused thread. For example, in the example in FIG. 7, for each jump instruction block, only one leaaj instruction is needed, and the leaaj instruction is obtained by modifying an original jump instruction. In the example in FIG. 6, for each jump instruction block, four instructions need to be used for jumping: two lea instructions, one cmovbe instruction, and one jmp instruction.

It should be noted that in the thread fusion solution shown in FIG. 7, because the processing core knows about a jump destination register before the jump instruction, the register does not need to be predicted.

Still as shown in FIG. 5, after multi-thread fusion is completed as described above, at block 530, a machine instruction in the fused thread is fetched in units of instruction blocks by using the processing core 430 for running.

Specifically, the current CPU fetches an instruction from the instruction decoding queue in units of instruction blocks each time (for example, a maximum quantity of instructions included in the instruction block can be 5 or 6, and a maximum quantity of instructions of an obtained instruction block is determined by a processing capability of the CPU, for example, can be determined by a quantity of instructions that can be executed by the CPU in a single instruction cycle). If the instruction block obtained by the CPU this time includes control transfer instructions based on a specified instruction block size, for example, a cmovbe instruction or a leaxxj instruction, and the control transfer instruction is not an end instruction of the obtained instruction block, because whether a subsequent instruction of the control transfer instruction is executed is still unclear, if an instruction subsequent to the control transfer instruction is fetched, the instruction subsequent to the control transfer instruction may be not executed. Consequently, a current value taking operation fails, and needs to be rolled back to an initial state of the current value taking operation. For this case, in the current value taking operation, a value is only taken until the control transfer instruction (for example, the leaxxj instruction), that is, an instruction block of current value taking is adjusted to use the control transfer instruction as the end instruction, to avoid rollback.

In addition, it should be noted that, when the machine instruction is running, if the processing core 430 has fetched the leaxxj instruction, an instruction block corresponding to an address stored in the register rn in the leaxxj instruction is pre-fetched from a cache or a memory into the instruction decoding queue of the processing core 430. For example, when the instruction leaxxj L_loop_2(r4), r6 is to be fetched, it is already known that a destination address indicated by r6 needs to be jumped to next time. Therefore, an instruction block (an instruction block of Thread 2) at the address indicated by r6 is pre-fetched to the instruction decoding queue of the CPU core. In this way, in a jump process, instructions continuously enter the instruction decoding queue, and running in the middle continues without interruption.

Figure 8:
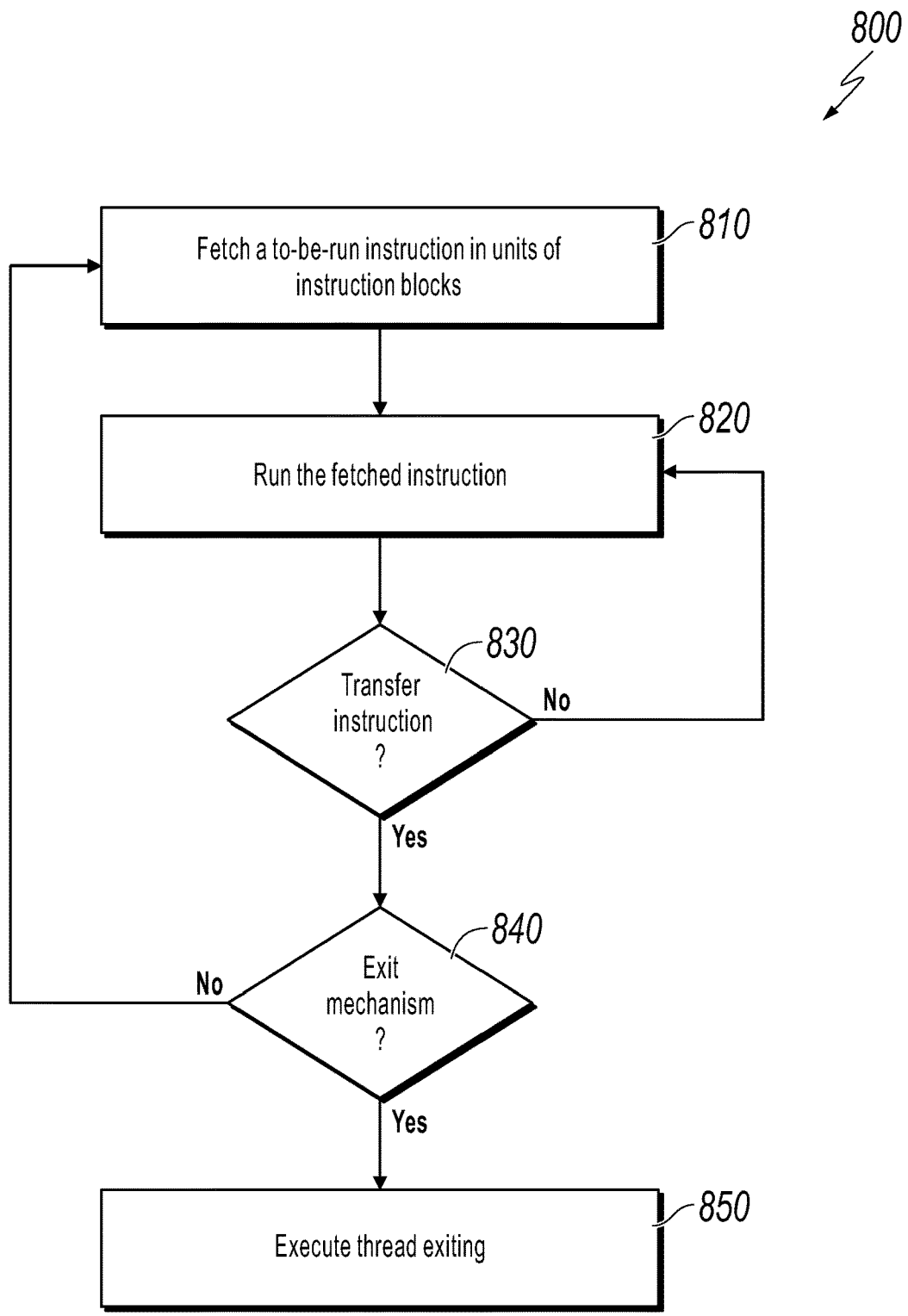
FIG. 8 is a flowchart illustrating a running process of a fused thread, according to an implementation of the present specification.

FIG. 8 is a flowchart illustrating a running process of a fused thread, according to an implementation of the present specification.

As shown in FIG. 8, at block 810, a processing core 430 obtains a machine instruction a fused thread in units of instruction blocks. For example, the processing core 430 obtains an instruction block 1 in Thread 1 in the fused thread shown in FIG. 7. Assuming that a size of the instruction block is five instructions, the instruction block 1 includes instructions "1.1 lea r6, L_Thread2(rip)", "1.2 lea r10, L_Thread3(rip)", "1.3 mov r1, r3", "L_loop_1:1.4 add (addr1), r1", and "1.5 mul r1, r2".

Then, at block 820, the processing core 430 sequentially runs t\instructions in the obtained instruction block. For example, the processing core 430 sequentially runs the instructions "1.1 lea r6, L_Thread2(rip)", "1.2 lea r10, L_Thread3(rip)", "1.3 mov r1, r3", "L_loop_1:1.4 add (addr1), r1", and "1.5 mul r1, r2" in the instruction block 1.

Next, at block 830, it is determined whether a currently running instruction is a control transfer instruction; and if it is the control transfer instruction, it is determined whether the control transfer instruction instructs a thread to exit.

For example, when a control transfer instruction leaxxj is used to fuse threads, if L_loop_i in the leaxxj instruction is set to a specified value (for example, 0xff ff ff ff ff ff ff ff), it indicates that the thread is ready. In addition, a register has a flag bit used to indicate a status of the register, and the status includes a first state indicating normal use and a second state indicating that the register points to another register. For example, a flag bit "0" is used to indicate the first state, and a flag bit "1" is used to indicate the second state.

When a machine instruction is running, if the processing core identifies that L_loop_i in the leaxxj instruction is a specified value (for example, 0xff ff ff ff ff ff ff ff), at block 850, the thread exits. Specifically, the processing core releases a physical register corresponding to a corresponding register, so that the corresponding register corresponds to a register used by a next thread, and "1" is assigned to a flag bit of the corresponding register. Generally, an instruction value is set to a value that the CPU cannot identify its meaning after reading the value, or that is identified as an invalid value, for example, 0xff ff ff ff ff ff ff ff. A thread exit mechanism is described below with reference to FIG. 9.

If the processing core identifies that L_loop_i in the leaxxj instruction is not a specified value, return to block 810, fetch a next instruction block, and perform a next cyclic operation. For example, an instruction block 2 is fetched, and the instruction block includes instructions "1.6 mov r2, addr2", "1.7 sub $1, r3", and "1.8 leaaj L_loop_1(r4), r6"; and a next cyclic operation is performed.

Figure 9:
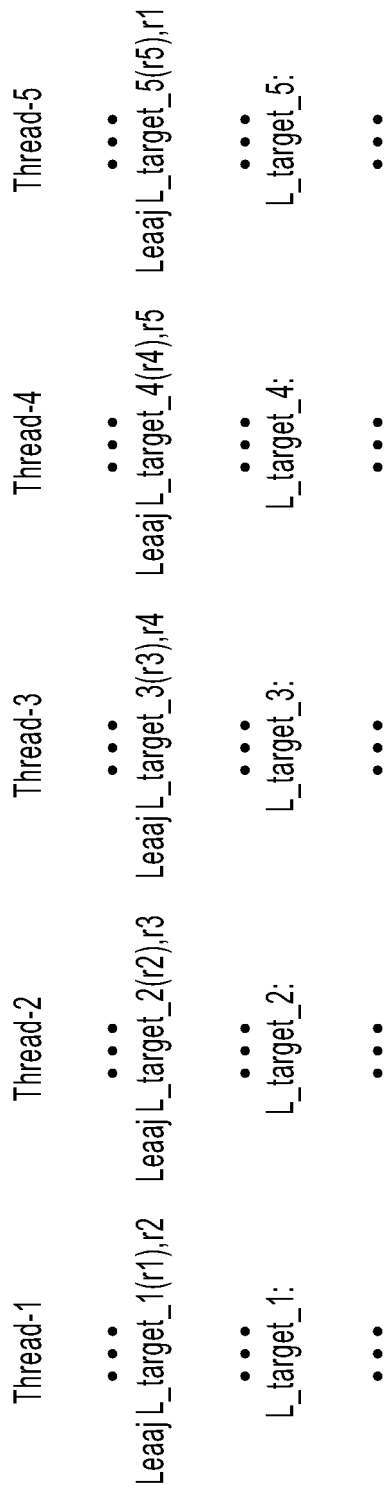
FIG. 9 is a schematic diagram illustrating a thread example of thread exiting, according to an implementation of the present specification.

FIG. 9 is a schematic diagram of a thread example of thread exiting, according to an implementation of the present specification. In FIG. 9, threads to be fused include Thread 1, Thread 2, Thread 3, Thread 4, and Thread 5.

Assuming that at the beginning of a thread fusion program, it is initialized that a register r1 points to a corresponding program address of Thread 1, a register r2 points to a corresponding program address of Thread 2, a register 3 points to a corresponding program address of Thread 3, a register r4 points to a corresponding program address of Thread 4, and a register r5 points to a corresponding program address of Thread 5.

In addition, a transition register is further disposed in the CPU, and the transition register is configured to reserve a destination register at a previous normal jump. For example, when Thread 1 normally executes an instruction leaxxj .L_target_1(r1), r2, the register r2 needs to be stored in the transition register during jumping. If Thread 2 also normally executes an instruction leaxxj .L_target_1(r2), r3, the register r3 needs to be stored in the transition register during jumping, to replace the register r2 stored last time. Here, a default value of the transition register is "0".

In the implementation of the present specification, registers r1, r2, r3, r4, and r5 used in a thread program are registers, and the registers point to physical registers. Therefore, content stored in the register can be changed by changing a mapping relationship between a register and a physical register, and a thread is ended with reference to a transition register.

In addition, a flag bit L is added to each register to indicate a status of the register. The status can include a first state indicating that the register is normally used, and a second state indicating that content corresponding to the register is another register. In the implementation of the present specification, for example, a value "0" can be used to indicate the first state and a value "1" can be used to indicate the second state.

A thread exit mechanism according to an implementation of the present specification is described in detail below with reference to FIG. 9.

After a period of normal running, after Thread 1 jumps normally, the transition register stores the register r2, then jumps to Thread 2, and starts to execute Thread 2.

If Thread 2 ends during running, an instruction leaxxj 0xff ff ff ff ff ff ff ff (r2), r3 is used for indication. Any offset address cannot be 0xff ff ff ff ff ff ff ff. Therefore, when the CPU runs the instruction, if it is found that the 0xff ff ff ff ff ff ff ff needs to be stored in the register r2, because the transition register stores the register r2, the CPU releases (if any) a physical register that the register r2 originally corresponds to, and a register (that is, the register r3) used by the Thread 3 is placed in space of the physical register corresponding to the register r2, and the flag bit L of the register r2 is set to 1. In an instruction renaming process, if it is found that the flag bit L corresponding to the register is 1, the CPU finds a real physical register based on the register (r3) stored in the register r2 at this time. Because the registers r2 and r3 point to a same physical register, when Thread 1 needs to jump to an address of the register r2 when running the leaxxj instruction again, Thread 1 directly jumps to context corresponding to Thread 3.

After a period of running, if Thread 3 also needs to execute an instruction leaxxj 0xff ff ff ff ff ff ff ff (r3), r4, because Thread 2 has exited, Thread 1 jumps to Thread 3, and the transition register stores the register r2. Therefore, the CPU stores, in space of a physical register corresponding to the register r2, the register r4 used by Thread 4, and the flag bit L of the register r2 is set to 1. In this way, when Thread 1 executes an instruction leaxxj .L_target_1(r1), r2 again, Thread 1 directly jumps into Thread 4, and so on.

If Thread 4 exits, the transition register stores the register r2, a register (that is, the register r5) used by Thread 5 is placed in the space of the physical register corresponding to r2. Therefore, Thread 1 directly jumps to Thread 5. When Thread 5 needs to exit, the transition register stores the register r2, and the register (that is, the register r1) used by Thread 1 is placed in the space of the physical register corresponding to r2. Therefore, when Thread 1 finds, during exiting, that the register corresponding to the register r2 is Thread 1 itself (that is, r1), Thread 1 normally exits, and the entire operation is completed.

Figure 10:
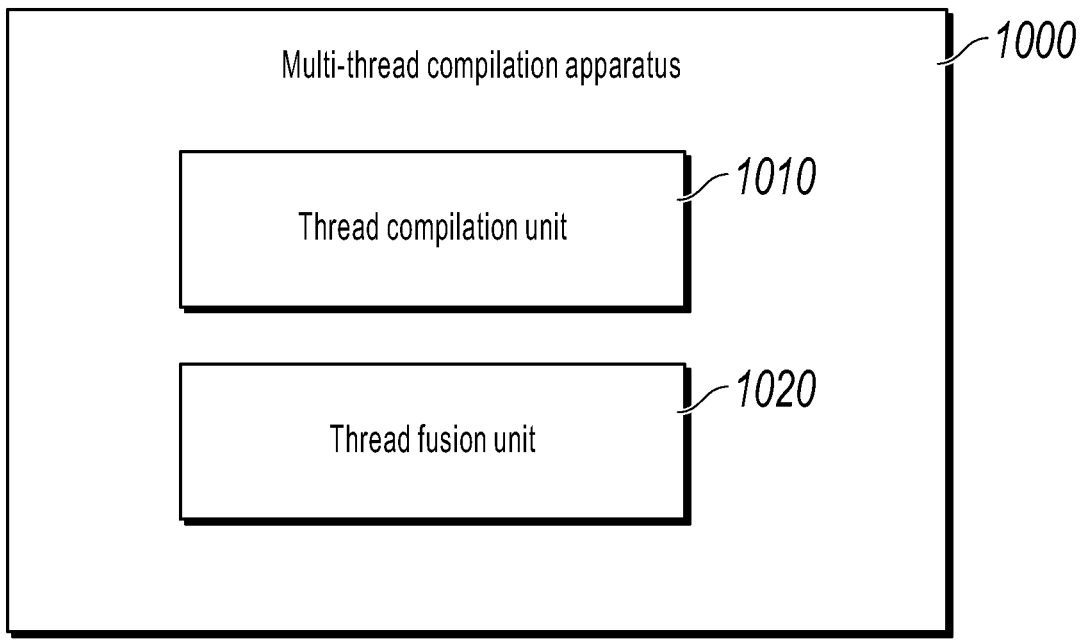
FIG. 10 is a block diagram illustrating a multi-thread compiling apparatus, according to an implementation of the present specification.

FIG. 10 is a block diagram illustrating a multi-thread compilation apparatus 1000, according to an implementation of the present specification. As shown in FIG. 10, the multi-thread compilation apparatus 1000 includes a thread compilation unit 1010 and a thread fusion unit 1020.

The thread compilation unit 1010 is configured to compile threads in a first quantity of to-be-processed threads by using different first register sets, to obtain corresponding machine instruction codes. For operations of the thread compilation unit 1010, refer to the operations of block 510 described above with reference to FIG. 5.

The thread fusion unit 1020 is configured to fuse the machine instruction codes of the threads by using first instructions in an instruction set supported by a processing core, to obtain a machine instruction code of a single fused thread. Here, the first instructions include load effective address instructions and control transfer instructions, the load effective address instructions and the control transfer instructions are compiled by using a second register different from the first register set, and the control transfer instruction is set in the machine instruction codes corresponding to the threads, to implement jump operations between the machine instruction codes of the threads. For operations of the thread fusion unit 1020, refer to the operations of block 520 described above with reference to FIG. 5 and operations described above with reference to FIG. 6 to FIG. 9.

The multi-thread compilation apparatus 1000 can further include control transfer instructions obtaining unit (not shown). The control transfer instruction obtaining unit is configured to obtain a first control transfer instruction by modifying some or all jump instructions in the machine instruction codes of the threads. The control transfer instructions obtaining unit further add second control transfer instructions based on control transfer instructions adding rules. The control transfer instruction adding rules include at least one of the following: making an interval between the control transfer instructions no more than a second predetermined quantity of instructions; and adding the second control transfer instructions after a suitable machine instruction by using an instruction compiler tuning policy.

Implementations of the multi-thread processing system, apparatus, and system according to the implementations of the present specification are described above with reference to FIG. 1 to FIG. 10. The multi-thread compilation apparatus/multi-thread processing system can be implemented by hardware, or can be implemented by software or a combination of hardware and software.

Figure 11:
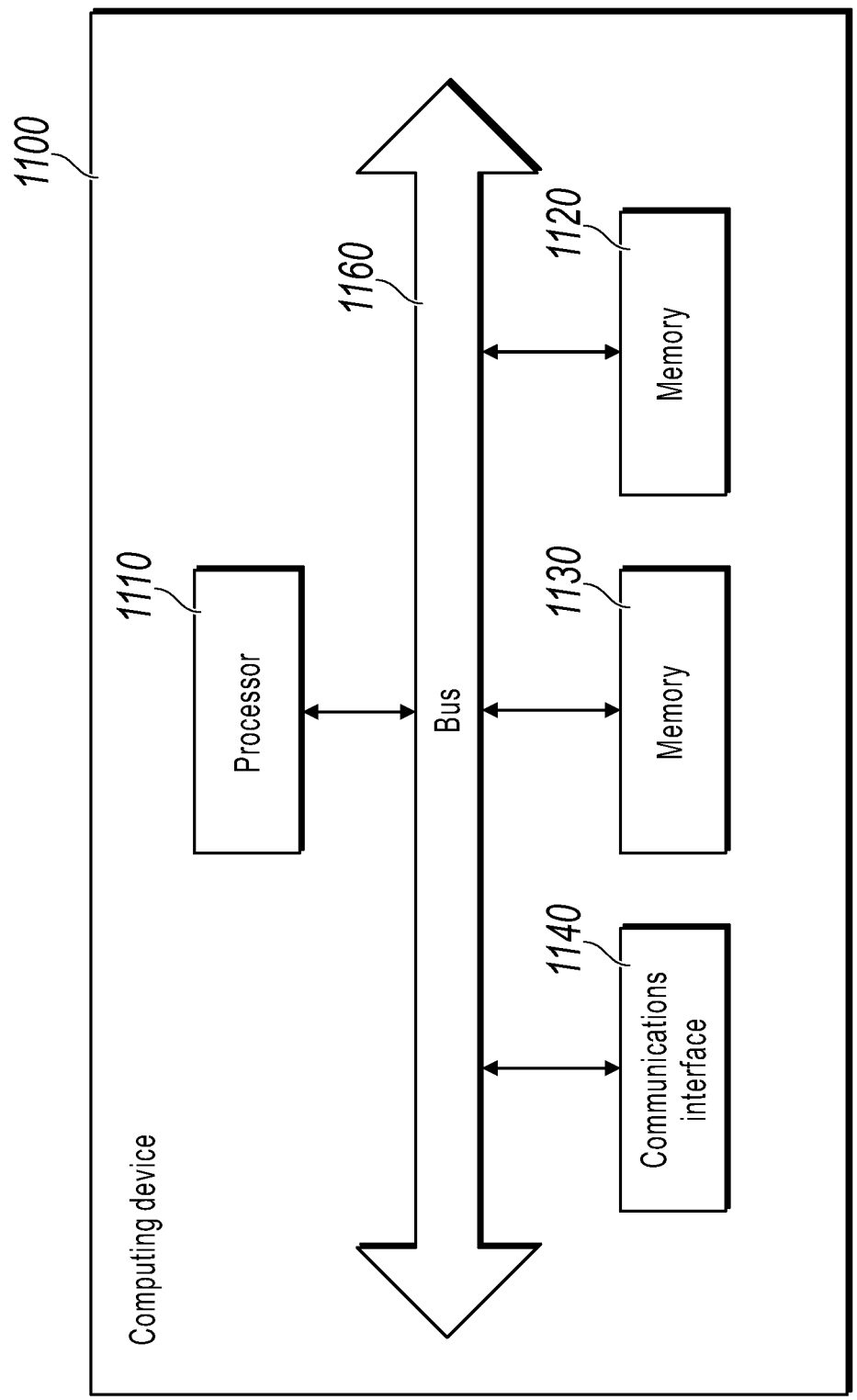
FIG. 11 is a block diagram illustrating a multi-thread processing computing device, according to an implementation of the present specification.

FIG. 11 is a structural block diagram illustrating a multi-thread processing computing device, according to an implementation of the present specification.

As shown in FIG. 11, a computing device 1100 can include at least one processor 1110, a memory (for example, a non-volatile memory) 1120, a memory 1130, a communications interface 1140, and an internal bus 1160, and the at least one processor 1110, the memory 1120, the memory 1130, and the communications interface 1140 are connected by using the bus 1160. The at least one processor 1110 executes at least one computer-readable instruction (that is, the elements implemented in a form of software) stored or encoded in a computer-readable storage medium.

In an implementation, a computer-executable instruction is stored in the memory, and when the instruction is executed, the at least one processor 1110 performs the following operations: compiling threads in a first quantity of to-be-processed threads by using different first register sets, to obtain corresponding machine instruction codes; and fusing the machine instruction codes of the threads by using first instructions in an instruction set supported by a processing core, to obtain a machine instruction code of a single fused thread; where the first instructions include load effective address instructions and control transfer instructions, the load effective address instructions and the control transfer instructions are compiled by using a second register different from the first register set, and the control transfer instructions are set in the machine instruction codes corresponding to the threads, to implement jump operations between the machine instruction codes of the threads.

It should be understood that, when the computer-executable instruction stored in the memory is executed, the at least one processor 1110 performs the operations and functions described with reference to FIG. 1 to FIG. 10 in the implementations of the present specification.

According to one implementation, a program product such as a non-temporary machine-readable medium is provided. The non-temporary machine-readable medium can have an instruction (that is, the element implemented in a software form). When the instruction is executed by a machine, the machine performs the operations and functions described with reference to FIG. 1 to FIG. 10 in the implementations of the present specification.

A system or an apparatus equipped with a readable storage medium can be provided, and the readable storage medium stores a software program code for implementing a function of any one of the implementations, so that a computer or a processor of the system or apparatus reads and executes an instruction stored in the readable storage medium.

In this case, the program code read from the readable medium can implement the function of any one of the implementations. Therefore, a machine-readable code and a readable storage medium that stores the machine-readable code form a part of the present specification.

Implementations of the readable storage medium include a floppy disk, a hard disk, a magneto-optical disk, an optical disc (such as a CD-ROM, a CD-R, a CD-RW, a DVD-ROM, a DVD-RAM, a DVD-RW, or a DVD-RW), a magnetic tape, a non-volatile memory card, and a ROM. Alternatively, a program code can be downloaded from a server computer or the cloud through a communication network.

A person skilled in the art should understand that various variations and modifications can be made to the implementations disclosed above without departing from the essence of the present specification. Therefore, the protection scope of the present specification shall be limited by the appended claims.

It should be noted that not all steps and units in the foregoing processes and system structure diagrams are mandatory, and some steps or units can be ignored based on actual needs. An execution sequence of the steps is not fixed, and can be determined as needed. The apparatus structure described in the implementations can be a physical structure, or can be a logical structure. To be specific, some units are implemented by a same physical entity, or some units are implemented by a plurality of physical entities, or are implemented jointly by some components in a plurality of independent devices.

In the implementations, a hardware unit or module can be implemented in a mechanical manner or an electrical manner. For example, a hardware unit, module, or processor can include a permanent dedicated circuit or logic (for example, a dedicated processor, an FPGA, or an ASIC) to complete corresponding operations. The hardware unit or processor can further include a programmable logic or circuit (such as a general-purpose processor or another programmable processor), and can be temporarily disposed by software to complete a corresponding operation. A specific implementation (a mechanical manner, a dedicated permanent circuit, or a temporarily set circuit) can be determined based on cost and time considerations.

Example implementations are described above with reference to specific implementations described in the accompanying drawings, but it does not indicate all implementations that can be implemented or that fall within the protection scope of the claims. The term "example" used throughout the specification means "used as an example or an instance" and does not mean "preferred" or "advantageous" over other implementations. For the purpose of providing an understanding of the described technology, a specific implementation includes specific details. However, these techniques can be implemented without these specific details. In some examples, well-known structures and apparatuses are shown in block diagrams to avoid making it difficult to understand the concepts of the described implementations.

The descriptions of the present disclosure are provided to enable any person of ordinary skill in the art to implement or use content of the present disclosure. For a person of ordinary skill in the art, various modifications made to the content of the present disclosure are obvious. In addition, the general principle described in the present specification can be applied to another variant without departing from the protection scope of the present disclosure. Therefore, the content of the present disclosure is not limited to the examples and designs described here, but is consistent with the widest range of principles and novelty features that conform to the present disclosure.

What is claimed is:

1. A computer-implemented method for multi-thread processing, the method comprising:
   compiling a first plurality of threads using a corresponding first register set for each thread in the first plurality of threads, to obtain a corresponding first plurality of machine instruction codes; and fusing the first plurality of machine instruction codes to obtain machine instruction code of a fused thread, the machine instruction code of the fused thread comprising thread portions corresponding to each thread of the first plurality of threads, wherein fusing the first plurality of machine instruction codes comprises inserting, into the machine instruction code of the fused thread, a plurality of instructions in an instruction set supported by a processing core, and wherein the plurality of instructions comprise control transfer instructions, wherein the control transfer instructions are compiled using a second register set, wherein jump operations between thread portions are implemented by the control transfer instructions inserted into the machine instruction code of the fused thread, and wherein the plurality of instructions comprise a first instruction to:

perform one of the following:

store, upon determining that a condition is satisfied, an indicated instruction address in a first register used to compile instructions related to a first thread of the first plurality of threads, or store, upon determining that the condition is not satisfied, an instruction address of a next instruction after the first instruction in the first register, and jump to a second instruction corresponding to an address stored in a second register used to compile instructions related to a second thread of the first plurality of threads.

2. The computer-implemented method of claim 1, wherein a quantity of threads in the first plurality of threads does not exceed a first predetermined threshold, and wherein the first predetermined threshold is determined based on a quantity of registers available to the processing core.

3. The computer-implemented method of claim 1, wherein the control transfer instructions comprise a first control transfer instruction obtained by modifying one or more jump instructions in the first plurality of machine instruction codes.

4. The computer-implemented method of claim 3, wherein the control transfer instructions further comprise a second control transfer instruction included based on control transfer instruction adding rules, wherein the control transfer instruction adding rules comprise at least one of the following:

making an interval between the first and second control transfer instructions no more than a predetermined quantity of instructions; and inserting the second control transfer instruction into the machine instruction code of the fused thread at a position that improves a running efficiency of the machine instruction code of the fused thread.

5. The computer-implemented method of claim 4, wherein the predetermined quantity of instructions is determined based on a quantity of instructions that the processing core can execute in a single instruction cycle.

6. The computer-implemented method of claim 1, wherein each thread portion comprises at least one jump instruction block.

7. The computer-implemented method of claim 6, wherein, for each thread portion of at least a portion of the thread portions, load effective address instructions in the thread portion comprise a first load effective address instruction, wherein the first load effective address instruction is placed at a beginning of the thread portion, and wherein the first load effective address instruction is used to move an address corresponding to a first instruction of the thread portion to another register; and wherein, for each jump instruction block in each thread portion, load effective address instructions in the thread portion comprise second and third load effective address instructions, wherein the second load effective address instruction is used to move an address corresponding to a first instruction of the jump instruction block to another register, wherein the third load effective address instruction is used to move an address corresponding to a first instruction after the jump instruction block to another register, and wherein the second and third load effective address instructions are placed between the jump instruction block and a previous jump instruction block.

8. The computer-implemented method of claim 1, wherein the condition comprises a first value being greater than or equal to a second value, the first value being greater than the second value, or a carry being generated, or a carry not being generated.

9. A non-transitory, computer-readable medium storing one or more instructions that, when executed by a computer system, cause the computer system to perform operations comprising:

compiling a first plurality of threads using a corresponding first register set for each thread in the first plurality of threads, to obtain a corresponding first plurality of machine instruction codes; and fusing the first plurality of machine instruction codes to obtain machine instruction code of a fused thread, the machine instruction code of the fused thread comprising thread portions corresponding to each thread of the first plurality of threads, wherein fusing the first plurality of machine instruction codes comprises inserting, into the machine instruction code of the fused thread, a plurality of instructions in an instruction set supported by a processing core, and wherein the plurality of instructions comprise control transfer instructions, wherein the control transfer instructions are compiled using a second register set, wherein jump operations between thread portions are implemented by the control transfer instructions inserted into the machine instruction code of the fused thread, and wherein the plurality of instructions comprise a first instruction to:

perform one of the following:

store, upon determining that a condition is satisfied, an indicated instruction address in a first register used to compile instructions related to a first thread of the first plurality of threads, or store, upon determining that the condition is not satisfied, an instruction address of a next instruction after the first instruction in the first register, and jump to a second instruction corresponding to an address stored in a second register used to compile instructions related to a second thread of the first plurality of threads.

10. The computer-readable medium of claim 9, wherein a quantity of threads in the first plurality of threads does not exceed a first predetermined threshold, and wherein the first predetermined threshold is determined based on a quantity of registers available to the processing core.

11. The computer-readable medium of claim 9, wherein the control transfer instructions comprise a first control transfer instruction obtained by modifying one or more jump instructions in the first plurality of machine instruction codes.

12. The computer-readable medium of claim 11, wherein the control transfer instructions further comprise a second control transfer instruction included based on control transfer instruction adding rules, wherein the control transfer instruction adding rules comprise at least one of the following:
   making an interval between the first and second control transfer instructions no more than a predetermined quantity of instructions; and
   inserting the second control transfer instruction into the machine instruction code of the fused thread at a position that improves a running efficiency of the machine instruction code of the fused thread.

13. The computer-readable medium of claim 12, wherein the predetermined quantity of instructions is determined based on a quantity of instructions that the processing core can execute in a single instruction cycle.

14. The computer-readable medium of claim 9, wherein each thread portion comprises at least one jump instruction block.

15. The computer-readable medium of claim 14, wherein, for each thread portion of at least a portion of the thread portions, load effective address instructions in the thread portion comprise a first load effective address instruction, wherein the first load effective address instruction is placed at a beginning of the thread portion, and wherein the first load effective address instruction is used to move an address corresponding to a first instruction of the thread portion to another register; and
   wherein, for each jump instruction block in each thread portion, load effective address instructions in the thread portion comprise second and third load effective address instructions,
   wherein the second load effective address instruction is used to move an address corresponding to a first instruction of the jump instruction block to another register,
   wherein the third load effective address instruction is used to move an address corresponding to a first instruction after the jump instruction block to another register, and
   wherein the second and third load effective address instructions are placed between the jump instruction block and a previous jump instruction block.

16. A computer-implemented system, comprising:
   one or more computers; and
   one or more computer memory devices interoperably coupled with the one or more computers and having tangible, non-transitory, machine-readable media storing one or more instructions that, when executed by the one or more computers, cause the one or more computers to perform one or more operations comprising:
   compiling a first plurality of threads using a corresponding first register set for each thread in the first plurality of threads, to obtain a corresponding first plurality of machine instruction codes; and
   fusing the first plurality of machine instruction codes to obtain machine instruction code of a fused thread, the machine instruction code of the fused thread comprising thread portions corresponding to each thread of the first plurality of threads, wherein fusing the first plurality of machine instruction codes comprises inserting, into the machine instruction code of the fused thread, a plurality of instructions in an instruction set supported by a processing core, and
   wherein the plurality of instructions comprise control transfer instructions, wherein the control transfer instructions are compiled using a second register set, wherein jump operations between thread portions are implemented by the control transfer instructions inserted into the machine instruction code of the fused thread, and
   wherein the plurality of instructions comprise a first instruction to:
   perform one of the following:
      store, upon determining that a condition is satisfied, an indicated instruction address in a first register used to compile instructions related to a first thread of the first plurality of threads, or
      store, upon determining that the condition is not satisfied, an instruction address of a next instruction after the first instruction in the first register, and
   jump to a second instruction corresponding to an address stored in a second register used to compile instructions related to a second thread of the first plurality of threads.

17. The computer-implemented system of claim 16, wherein a quantity of threads in the first plurality of threads does not exceed a first predetermined threshold, and wherein the first predetermined threshold is determined based on a quantity of registers available to the processing core.

18. The computer-implemented system of claim 16, wherein the control transfer instructions comprise a first control transfer instruction obtained by modifying one or more jump instructions in the first plurality of machine instruction codes.

19. The computer-implemented system of claim 18, wherein the control transfer instructions further comprise a second control transfer instruction included based on control transfer instruction adding rules, wherein the control transfer instruction adding rules comprise at least one of the following:
   making an interval between the first and second control transfer instructions no more than a predetermined quantity of instructions; and
   inserting the second control transfer instruction into the machine instruction code of the fused thread at a position that improves a running efficiency of the machine instruction code of the fused thread.

20. The computer-implemented system of claim 19, wherein the predetermined quantity of instructions is determined based on a quantity of instructions that the processing core can execute in a single instruction cycle.

21. The computer-implemented system of claim 16, wherein each thread portion comprises at least one jump instruction block.

* * * * *